(12) United States Patent
Engelhardt et al.

(10) Patent No.: US 12,407,206 B2
(45) Date of Patent: Sep. 2, 2025

(54) STATOR FOR ELECTRIC MACHINE, ELECTRIC MACHINE, AND MOTOR VEHICLE

(71) Applicant: Dr. Ing. h.c. F. Porsche Aktiengesellschaft, Stuttgart (DE)

(72) Inventors: Tobias Engelhardt, Stuttgart (DE); Stefan Oechslen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 465 days.

(21) Appl. No.: 17/830,387

(22) Filed: Jun. 2, 2022

(65) Prior Publication Data
US 2022/0393538 A1 Dec. 8, 2022

(30) Foreign Application Priority Data
Jun. 8, 2021 (DE) ...................... 10 2021 114 737.9

(51) Int. Cl.
| | | |
|---|---|---|
| H02K 1/20 | (2006.01) | |
| H02K 1/16 | (2006.01) | |
| H02K 3/34 | (2006.01) | |
| H02K 9/197 | (2006.01) | |
| H02K 15/021 | (2025.01) | |

(52) U.S. Cl.
CPC ............. H02K 3/345 (2013.01); H02K 1/165 (2013.01); H02K 1/20 (2013.01); H02K 9/197 (2013.01); H02K 15/021 (2025.01)

(58) Field of Classification Search
CPC ............ H02K 3/24; H02K 3/34; H02K 3/345; H02K 1/20; H02K 1/165; H02K 15/024; H02K 9/197

USPC ........................................................ 310/215
See application file for complete search history.

(56) References Cited

U.S. PATENT DOCUMENTS

| | | | |
|---|---|---|---|
| 2,390,130 A * | 12/1945 | Sigmund ................. | H02K 1/20 |
| | | | 310/54 |
| 11,289,975 B2 | 3/2022 | Bethge et al. | |
| 11,984,781 B2 | 5/2024 | Cunningham et al. | |
| 12,206,306 B2 | 1/2025 | E Silva et al. | |
| 2004/0017954 A1* | 1/2004 | Komori ................. | F16C 33/104 |
| | | | 384/100 |
| 2017/0063200 A1 | 3/2017 | Tremelling et al. | |
| 2019/0109513 A1* | 4/2019 | Bethge ................... | H02K 9/197 |
| 2020/0153306 A1 | 5/2020 | Uhlmann | |

(Continued)

FOREIGN PATENT DOCUMENTS

| | | |
|---|---|---|
| CN | 111200327 A | 5/2020 |
| CN | 111434009 A | 7/2020 |

(Continued)

*Primary Examiner* — Tulsidas C Patel
*Assistant Examiner* — Robert E Mates
(74) *Attorney, Agent, or Firm* — LEYDIG, VOIT & MAYER, LTD.

(57) ABSTRACT

A stator for an electric machine includes a laminated stator core having stator slots arranged along an axial direction parallel to a stator axis, electric conductors arranged in the stator slots; and fluidtight slot insulators arranged in the stator slots between the electric conductors and the laminated stator core, wherein the slot insulators each have a cooling channel spaced apart from the electric conductors in a radial direction arranged orthogonally to the axial direction.

13 Claims, 2 Drawing Sheets

(56) References Cited

U.S. PATENT DOCUMENTS

| | | | |
|---|---|---|---|
| 2020/0161918 A1* | 5/2020 | Almeida E Silva ... | H02K 1/165 |
| 2020/0295615 A1 | 9/2020 | Cunningham et al. | |
| 2020/0412193 A1* | 12/2020 | Eilenberger ........... | H02K 11/25 |
| 2022/0123615 A1 | 4/2022 | Masfaraud et al. | |

FOREIGN PATENT DOCUMENTS

| | | |
|---|---|---|
| DE | 102017213662 A1 | 2/2019 |
| EP | 3223394 A1 | 9/2017 |
| JP | S49123430 U | 10/1974 |
| JP | S51049410 U | 4/1976 |
| JP | S59050547 U | 9/1982 |
| JP | S60181149 U | 12/1985 |
| JP | 61002748 U | 1/1986 |
| JP | 2003250239 A | 9/2003 |
| JP | 2010166708 A | 7/2010 |
| JP | 2019154157 A | 9/2019 |
| JP | 2020089260 A | 6/2020 |
| JP | 2021505118 A | 2/2021 |
| JP | 2022529306 A | 6/2022 |
| WO | 2012085280 A2 | 6/2012 |
| WO | WO 2019183657 A1 | 10/2019 |
| WO | WO 2020174180 A1 | 9/2020 |

* cited by examiner (a)

(b)

STATOR FOR ELECTRIC MACHINE, ELECTRIC MACHINE, AND MOTOR VEHICLE

CROSS REFERENCE TO RELATED APPLICATIONS

This application claims benefit to German Patent Application No. DE 10 2021 114 737.9, filed on Jun. 8, 2021, which is hereby incorporated by reference herein.

FIELD

The present invention relates to a stator for an electric machine. The present invention furthermore relates to an electric machine having a stator and to a motor vehicle having an electric machine.

BACKGROUND

Electric machines, in particular high-performance electric machines, need to be cooled during operation. Typically, the temperature compatibility of components of the electric machine has a power-limiting effect, as a result of which particular attention is paid to cooling.

It has proven to be particularly effective to apply a cooling liquid, for example an oil, directly to the electric conductors of the stator of an electric machine. For this purpose, the cooling liquid is usually introduced into a winding overhang region of the stator. The cooling liquid flows further along the electric conductors, through stator slots of the stator, into a further winding overhang region. There, the cooling liquid can emerge from the stator, and the heat absorbed by the cooling liquid can be dissipated.

Although the method described from the prior art is very efficient, the passage of the cooling liquid through the stator slots along the electric lines causes a high flow resistance, which requires correspondingly powerful pumps for generating the cooling liquid flow and leads to high costs, a high weight and a large installation space required for the pumps.

Therefore, what is needed is a stator for an electric machine which does not have the stated disadvantages of the prior art but allows the use of smaller and thus lighter and more favorable pumps for generating the cooling liquid flow.

SUMMARY

In an embodiment, the present disclosure provides a stator for an electric machine, comprising a laminated stator core having stator slots arranged along an axial direction parallel to a stator axis, electric conductors arranged in the stator slots; and fluidtight slot insulators arranged in the stator slots between the electric conductors and the laminated stator core, wherein the slot insulators each have a cooling channel spaced apart from the electric conductors in a radial direction arranged orthogonally to the axial direction.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
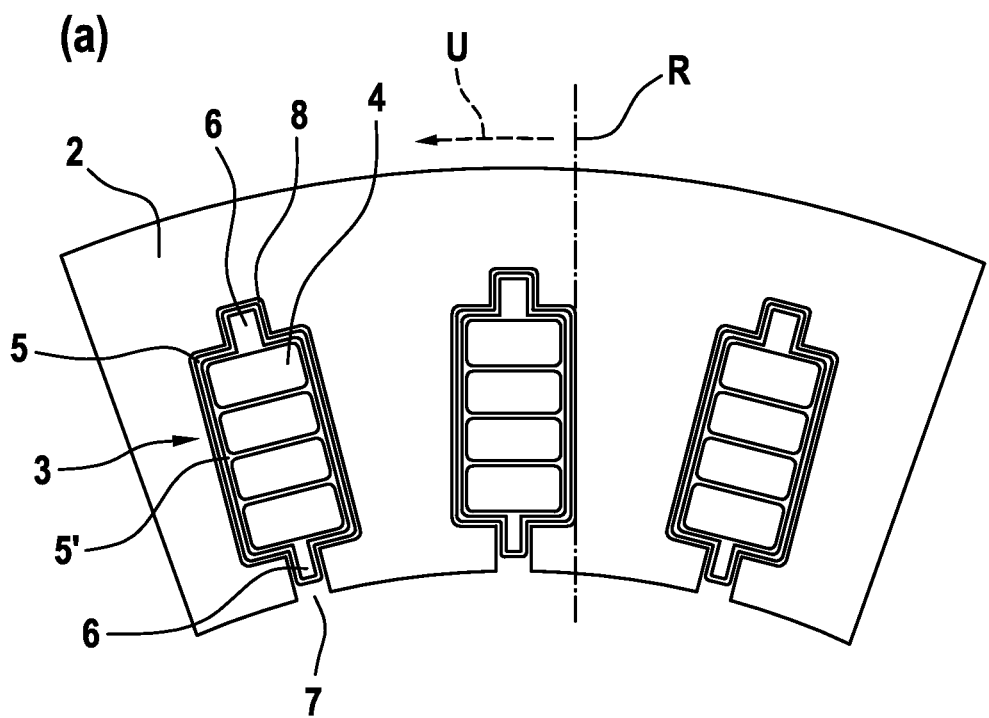
FIGS. 1 (a) and (b) each schematically illustrate a detail of a stator according to an illustrative embodiment of the present invention.
Figure 1:
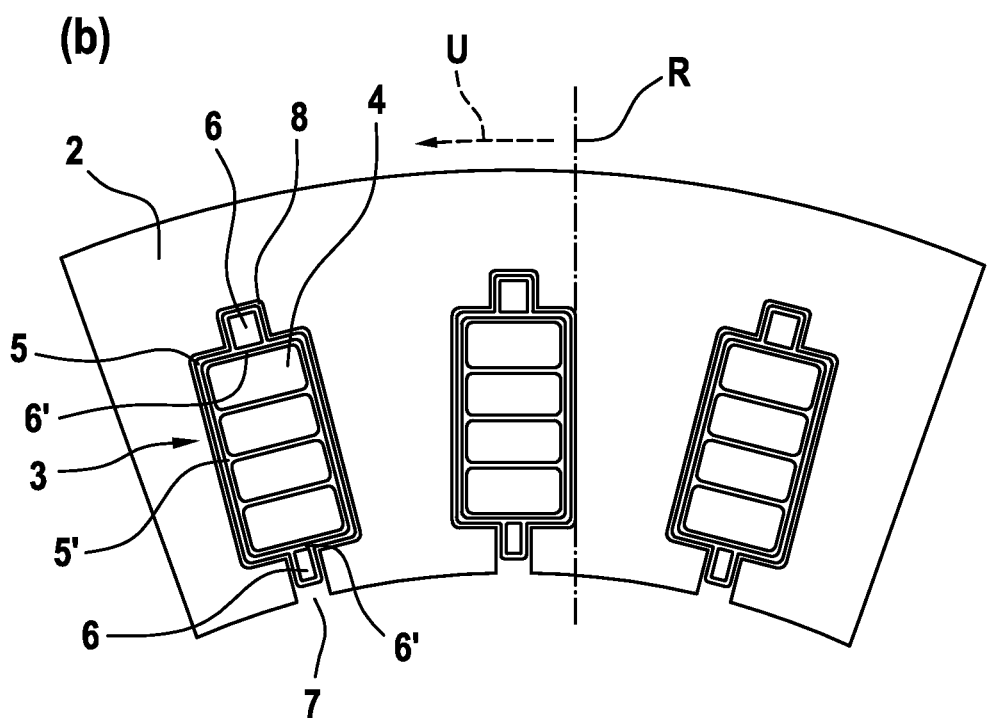

In an embodiment, a stator for an electric machine has a laminated stator core, wherein the laminated stator core has stator slots arranged along an axial direction parallel to a stator axis, wherein electric conductors are arranged in the stator slots, wherein fluidtight slot insulators are arranged in the stator slots between the electric conductors and the laminated stator core, wherein the slot insulators each have a cooling channel spaced apart from the electric conductors in a radial direction arranged orthogonally to the axial direction.

The stator according to an embodiment of the invention makes it possible to use smaller pumps which are significantly lighter and more favorable. The cooling channels noticeably reduce the flow resistance, and at the same time the efficiency of the cooling of the electric conductors is hardly impaired and, in particular, the efficiency of the cooling of the winding overhangs is not impaired at all. Furthermore, the lower flow resistance leads to a significantly longer service life of the pumps.

Provision is preferably made for the electric conductors to be conductor rails with, in particular, a rectangular cross section. In some embodiments, the electric conductors are hairpin elements.

Provision is preferably made for the slot insulators to be produced from PEEK. It is conceivable for the slot insulators to be inserted into the stator slots. However, it is also conceivable for the slot insulators to be laminated or molded into the stator slots.

The use of slot insulators makes it possible for the laminated stator core to be punch-assembled. However, it is also conceivable for the laminated stator core to be assembled by means of welding, preferably laser welding, along the back of the stator or by means of the application of a baked enamel.

Provision is preferably made for the stator to be a stator of an internal-rotor machine.

According to an embodiment of the invention, provision is made for the cooling channels to be arranged in slot slits of the laminated stator core. An arrangement of the cooling channels with only slight or no impairment of the electromagnetic properties of the stator is thereby made possible in an advantageous manner. It is conceivable for the cooling channels to be provided as projections of the slot insulators into the slot slits. In particular, provision is made for the cooling channels not to project beyond the electric conductors in the direction of rotation of the laminated stator core.

According to an embodiment of the invention, provision is made for the cooling channels to be arranged in a recess on the yoke side of the laminated stator core. Very good cooling on the yoke side of the electric lines is thereby obtained in an advantageous manner. Provision is preferably made for the recesses and the cooling channels not to project beyond the electric conductors in the direction of rotation of the laminated stator core, but preferably to have a smaller extent in the direction of rotation than the electric conductors.

According to an embodiment of the invention, provision is made for the electric conductors to be arranged in inner spaces of the slot insulators, wherein the cooling channels are fluidically connected to the inner spaces. This makes it possible in an advantageous manner for the cooling liquid to flow both through the cooling channels and through the inner spaces and, in the process, for the electric conductors to be acted upon directly by the cooling liquid, and thus cooled, with a low flow resistance.

According to an embodiment of the invention, provision is made for the electric conductors to be arranged in inner spaces of the slot insulators, wherein the cooling channels are separated from the inner spaces in a fluidtight manner. In other words, the electric conductors are cooled indirectly. By virtue of the fluidic separation of the cooling channels from the inner spaces, a very stable structure of the slot insulators is made possible. Partition walls, which are preferably provided for separating the cooling channels from the inner spaces, stiffen the slot insulators, leading to significantly improved handling during the production of the stator.

According to an embodiment of the invention, provision is made for the stator to have an end plate on an end face of the laminated stator core, wherein the end plate has a radial part, wherein a main direction of extent of the radial part is arranged in the radial direction, wherein the radial part has openings for passing the electric lines through the radial part from the stator slots into a winding overhang region of the stator and further openings for fluidically connecting the cooling channels to the winding overhang region. As a result, the winding overhang space is closed off with respect to the laminated stator core, making it possible to prevent cooling liquid from getting out of the winding overhang region into the air gap of the electric machine between the rotor and the stator and leading there to severe frictional losses.

Provision is preferably made for the end plate to be secured in a fluidtight manner to the end face, thus ensuring that no cooling liquid can get between the end plate and the end face. Furthermore, provision is preferably made for the end plate itself to be fluidtight.

Provision is preferably made for the end plate to be produced from an electrically insulating material. It is conceivable for the end plate to be produced from a plastic, preferably from a fiber-reinforced plastic.

According to an embodiment of the invention, provision is made for the openings to have fluidtight seals between the winding overhang space and the inner spaces of the cooling channels. This ensures in an advantageous manner that, particularly in the case of indirect cooling of the electric conductors in the stator slots, no cooling liquid gets out of the winding overhang region into the inner spaces.

According to an embodiment of the invention, provision is made for edges of the openings to be connected in a fluidtight manner to edges of the slot insulators, wherein the edges of the openings are preferably welded or adhesively bonded to the edges of the slot insulators or are molded onto the edges of the slot insulators. This is an advantageous way of ensuring that no cooling liquid gets between the end plate and the end face at the openings and from there gets into the air gap.

Provision is preferably made for edges of the further openings to be connected in a fluidtight manner to edges of the slot insulators, in particular to edges of the cooling channels, wherein the edges of the openings are preferably welded or adhesively bonded to the edges of the slot insulators or are molded onto the edges of the slot insulators.

According to an embodiment of the invention, provision is made for the end plate to have an axial part, wherein a main direction of extent of the axial part is arranged in the axial direction, wherein the axial part has channels, wherein the channels are arranged along a main direction of extent of the cooling channels. This ensures in an advantageous manner that no additional can has to be provided to seal off the air gap. At the same time, the channels have the effect that the flow resistance is not increased by the axial part.

However, it is also conceivable for the stator and/or preferably the electric machine to have a can, wherein the can has channels, wherein the channels are arranged along a main direction of extent of the cooling channels.

According to an embodiment of the invention, provision is made for the end plate, in particular the radial part, to be adhesively bonded to the end face of the laminated stator core or to be molded onto the end face of the laminated stator core. In an advantageous manner, this ensures very good sealing in order to prevent the escape of cooling liquid from the winding overhang space into a region between the end plate and the end face.

In an embodiment, an electric machine having a stator according to the invention is provided.

In an embodiment, a motor vehicle having an electric machine according to the invention is provided.

All the details, features and advantages previously disclosed in connection with the stator according to the invention likewise relate to the electric machine according to the invention and to the motor vehicle according to the invention.

Further details, features and advantages of the invention will be found in the drawings and in the following description of preferred embodiments with reference to the drawings. The drawings merely illustrate exemplary embodiments of the invention, which do not restrict the concept of the invention.

FIGS. 1 (*a*) and (*b*) each schematically illustrate a detail of a stator 1 according to an illustrative embodiment of the present invention.

FIG. 1 (*a*) illustrates part of the stator 1. It shows a laminated stator core 2 with three stator slots 3. Electric conductors 4, preferably parts of a hairpin winding, are arranged in the stator slots 3. Electrically insulating slot insulators 5, which are preferably produced from PEEK, are provided between the electric conductors 4 and the laminated stator core 2.

The slot insulators 5 are fluidtight. This makes it possible for a cooling liquid, for example an oil, to flow through the slot insulators 5 and to act directly on and cool the electric conductors 4 arranged in the inner spaces 5' of the slot insulators 5. The fluidtightness of the slot insulators 5 is an effective means of preventing the cooling liquid from getting through slot slits 7 into a region between the stator 1 and a rotor (see FIG. 3), referred to as the "air gap", and leading there to severe frictional losses.

In order to reduce the flow resistance which counteracts the cooling liquid flowing through, cooling channels 6 spaced apart from the electric conductors 4 in the radial direction R are provided. Owing to the lower flow resistance, it is possible to use smaller, lighter and more favorable pumps to generate the cooling liquid flow. In the embodiment shown here, cooling channels 6 are provided in recesses 8 on the yoke side of the laminated stator core 2 and in the slot slits 7. Uniform cooling of the electric conductors 4 is thereby achieved.

For better mechanical support of the electric conductors 4, provision is made for the cooling channels 6 to extend less far in the circumferential direction U than the electric conductors 4.

FIG. 1 (*b*) schematically shows part of a stator 1 according to another preferred embodiment of the present invention. Like the stator shown in FIG. 1 (*a*), the stator 1 likewise has electric conductors 4 arranged in the stator slots 3. The slot insulators 5 with the cooling channels 6 spaced apart from the electric conductors in the radial direction R are arranged around the electric conductors 4 in the slot slits 7 and the recesses 8 on the yoke side of the laminated stator core 2.

The exemplary embodiment shown here differs from that in FIG. 1 (*a*) in that partition walls 6' are arranged between the cooling channels 6 and the inner spaces 5' of the slot insulators 5 in which the electric conductors 4 are arranged. The partition walls 6' are fluidtight and prevent cooling liquid from getting from the cooling channels 6 into the inner spaces 5.

Although the indirect cooling of the electric conductors 4 results in a slight deterioration in cooling efficiency compared with the exemplary embodiment shown in FIG. 1 (*a*), the partition walls 6' significantly increase the stiffness of the slot insulators 5, contributing to improved handling during the manufacture of the stator 1.

Figure 2:
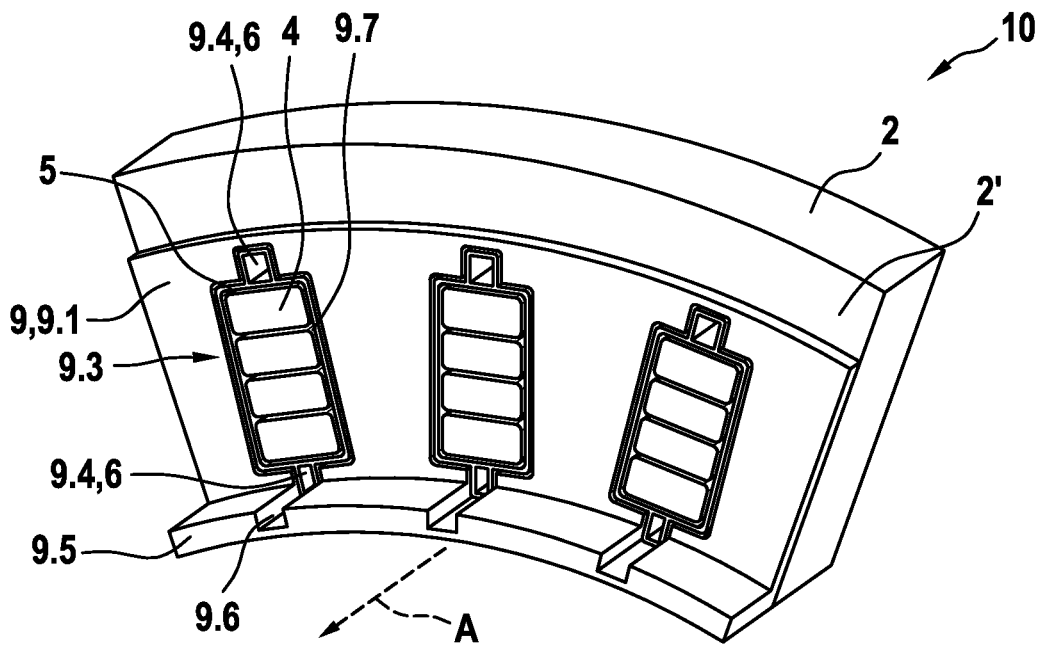
FIG. 2 schematically illustrates a detail of a stator according to an illustrative embodiment of the present invention.

FIG. 2 schematically illustrates a detail of a stator 1 according to an illustrative embodiment of the present invention in a perspective view. It shows an electrically insulating and fluidtight end plate 9 arranged on an end face 2' of the laminated stator core 2.

The end plate 9 has a radial part 9.1, which is connected in a fluidtight manner to the end face 2'. The radial part 9.1 has openings 9.3 for passing the electric conductors 4 out of the stator slots (see FIGS. 1 (*a*) and (*b*)) into a winding overhang region 10. Furthermore, the radial part 9.1 has further openings 9.4, through which the cooling channels 6 are connected to the winding overhang region 10.

In order to ensure a high degree of leaktightness and to prevent cooling liquid from getting out of the winding overhang region 10 between the end plate 9 and the end face 2', the edges of the openings 9.3 and the edges of the further openings 9.4 are connected in a fluidtight manner to the slot insulators 5.

Furthermore, in the region of the openings 9.3, the stator 2 has seals 9.7 which prevent penetration of cooling liquid from the winding overhang region 10 into the inner spaces (see FIGS. 1 (*a*) and (*b*)).

The end plate 9 furthermore has an axial part 9.5, which extends in the axial direction A. The axial part 9.5 prevents cooling liquid from getting out of the winding overhang region 10 into a rotor space and thus into the air gap. To further reduce the flow resistance, the axial part 9.5 has channels 9.6, which extend in the axial direction A in front of the cooling channels 6 which are arranged in the slot slits (see FIGS. 1 (*a*) and (*b*)).

Figure 3:
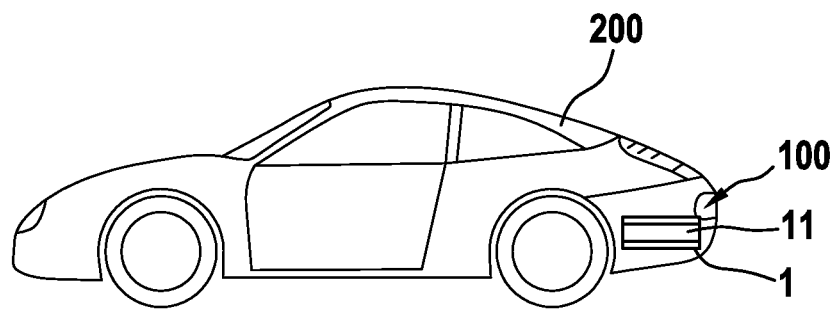
FIG. 3 schematically illustrates a motor vehicle according to an illustrative embodiment of the present invention with an electric machine according to an illustrative embodiment of the present invention.

FIG. 3 schematically illustrates a motor vehicle 200 according to an illustrative embodiment of the present invention with an electric machine 100 according to an illustrative embodiment of the present invention. The electric machine 100 has a rotor 11 and a stator according to an illustrative embodiment of the present invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 stator
2 laminated stator core
2' end face
3 stator slot
4 electric conductor
5 slot insulator
5' inner space
6 cooling channel
6' partition wall
7 slot slit
8 recess
9 end plate
9.1 radial part
9.3 opening
9.4 further opening
9.5 axial part
9.6 channel
9.7 seal
10 winding overhang region
11 rotor
100 electric machine
200 motor vehicle
A axial direction
R radial direction
U circumferential direction

The invention claimed is:

1. A stator for an electric machine, comprising:
a laminated stator core having stator slots arranged along an axial direction parallel to a stator axis;
electric conductors arranged in the stator slots; and
fluidtight slot insulators arranged in the stator slots between the electric conductors and the laminated stator core,
wherein the slot insulators each have a cooling channel spaced apart from the electric conductors in a radial direction arranged orthogonally to the axial direction, wherein the cooling channels are arranged in slots of the laminated stator core and in yoke-side recesses of the laminated stator core, wherein the cooling channels have a smaller extension in a direction of rotation than the electric conductors, wherein the yoke-side recesses have a smaller extension in the direction of rotation than the electric conductors, and wherein the electric conductors are arranged in inner spaces of the slot insulators, and wherein the cooling channels are fluidically connected to the inner spaces.

2. The stator as claimed in claim 1, comprising an end plate on an end face of the laminated stator core, wherein the end plate has a radial part, wherein a main direction of extent of the radial part is arranged in the radial direction, and wherein the radial part has openings for passing the electric conductors through the radial part from the stator slots into a winding overhang region of the stator and further openings for fluidically connecting the cooling channels to the winding overhang region.

3. The stator as claimed in claim 2, wherein the openings of the radial part have fluidtight seals between the winding overhang region and inner spaces of the cooling channels.

4. The stator as claimed in claim 2, wherein the openings of the radial part have edges connected in a fluidtight manner to edges of the slot insulators.

5. The stator as claimed in claim 2, wherein the end plate has an axial part, wherein a main direction of extent of the axial part is arranged in the axial direction, wherein the axial part has channels, and wherein the channels are arranged along a main direction of extent of the cooling channels.

6. The stator as claimed in claim 2, wherein the radial part of the end plate is adhesively bonded to the end face of the laminated stator core.

7. An electric machine having a stator as claimed in claim 1.

8. A motor vehicle having an electric machine as claimed in claim 7.

9. The stator as claimed in claim 4, wherein the edges of the openings of the radial part are welded to the edges of the slot insulators.

10. The stator as claimed in claim 4, wherein the edges of the openings of the radial part are adhesively bonded to the edges of the slot insulators.

11. The stator as claimed in claim 4, wherein the edges of the openings of the radial part are molded onto edges of the slot insulators.

12. The stator as claimed in claim 6, wherein the radial part of the end plate is molded onto the end face of the laminated stator core.

13. A stator for an electric machine, comprising:

a laminated stator core having stator slots arranged along an axial direction parallel to a stator axis;

an end plate on an end face of the laminated stator core;

electric conductors arranged in the stator slots; and fluidtight slot insulators arranged in the stator slots between the electric conductors and the laminated stator core, wherein the slot insulators each have a cooling channel spaced apart from the electric conductors in a radial direction arranged orthogonally to the axial direction, wherein the cooling channels are arranged in slots of the laminated stator core and in yoke-side recesses of the laminated stator core, wherein the cooling channels have a smaller extension in a direction of rotation than the electric conductors, wherein the yoke-side recesses have a smaller extension in the direction of rotation than the electric conductors, wherein the end plate has a radial part, wherein a main direction of extent of the radial part is arranged in the radial direction, and wherein the radial part has openings for passing the electric conductors through the radial part from the stator slots into a winding overhang region of the stator and further openings for fluidically connecting the cooling channels to the winding overhang region.

* * * * *